United States Patent
Chiang

(10) Patent No.: US 8,208,075 B2
(45) Date of Patent: Jun. 26, 2012

(54) COLOR RECONSTRUCTION SYSTEM AND METHOD FOR A SECAM TELEVISION SIGNAL

(75) Inventor: Tsung Han Chiang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 660 days.

(21) Appl. No.: 12/385,472

(22) Filed: Apr. 9, 2009

(65) Prior Publication Data
US 2010/0060796 A1 Mar. 11, 2010

(30) Foreign Application Priority Data
Sep. 8, 2008 (TW) ................................ 97134371 A

(51) Int. Cl.
 *H04N 5/21* (2006.01)
 *H04N 9/66* (2006.01)
(52) U.S. Cl. ........................................ 348/631; 348/638
(58) Field of Classification Search .................. 348/638, 348/708, 710, 713, 621, 624, 630, 631, 649
See application file for complete search history.

(56) References Cited

U.S. PATENT DOCUMENTS

| | | | | |
|---|---|---|---|---|
| 4,183,051 A | * | 1/1980 | Richman | 348/631 |
| 4,593,310 A | * | 6/1986 | Songer | 348/628 |
| 4,688,080 A | * | 8/1987 | Wagner | 348/668 |
| 5,844,617 A | | 12/1998 | Faroudja | |
| 2003/0206245 A1 | * | 11/2003 | Lin et al. | 348/631 |
| 2005/0122431 A1 | * | 6/2005 | Lee et al. | 348/631 |
| 2006/0077301 A1 | * | 4/2006 | Okamoto | 348/638 |
| 2007/0200958 A1 | * | 8/2007 | Lin et al. | 348/631 |

* cited by examiner

*Primary Examiner* — Victor Kostak
(74) *Attorney, Agent, or Firm* — Bacon & Thomas, PLLC

(57) ABSTRACT

A color reconstruction system for an SECAM television signal includes a luminance and chrominance separator and color decoder, first and second line buffer blocks, a vertical similarity calculator and a reconstructor. The luminance and chrominance separator and color decoder receives and filters an SECAM television signal with a luminance and a chrominance to produce a luminance signal and a chrominance signal. The first line buffer block temporarily stores the luminance signal. The second line buffer block temporarily stores the color difference signal. The vertical similarity calculator produces an upper similarity coefficient and a lower similarity coefficient based on the luminance signals produced by the luminance and chrominance separator and color decoder and temporarily stored in the first line buffer block respectively. The reconstructor depends on the upper and lower similarity coefficients to adjust the chrominance signal temporarily stored in the second line buffer block to produce a reconstructed chrominance signal.

12 Claims, 6 Drawing Sheets

COLOR RECONSTRUCTION SYSTEM AND METHOD FOR A SECAM TELEVISION SIGNAL

BACKGROUND OF THE INVENTION

1. Field of the Invention

The present invention relates to the technical field of image processing and, more particularly, to a color reconstruction system and method for a Sequential Color with Memory (SECAM) television signal.

2. Description of Related Art

FIG. 1 is a schematic diagram of a typical Sequential Color with Memory (SECAM) signal coding. As shown in FIG. 1, the SECAM signal coding uses two chrominance signals $D_B$ and $D_R$ to represent the color signals. The signals are presented on the scan lines in interlacing. Namely, the chrominance signals $D_B$ and $D_R$ on the scan lines are sequentially interlaced. A chrominance signal $D_B$ of the SECAM signal is generated by subtracting the luminance signal Y from the blue signal B of an RGB signal. Similarly, a chrominance signal $D_R$ of the SECAM signal is generated by subtracting the luminance signal Y from the red signal R of the RGB signal. At the transmitting end, the chrominance signals $D_B$ and $D_R$ of the SECAM signal are modulated by different frequency subcarriers for output.

As shown in FIG. 1, the chrominance signal $D_B$ is present on Line 110 only, and the chrominance signal $D_R$ is present on Line 120 only. Accordingly, the decoder at the receiving end typically requires one scan line delay, and the output signal after decoding can have both the chrominance signals $D_B$ and $D_R$ through an interpolation operation. FIG. 2 is a block diagram of a typical SECAM signal decoder. When a SECAM signal is received, the luminance and chrominance separator 210 can separate the luminance signal Y from the chrominance signal ($D_B$, $D_R$). Subsequently, the color demodulator 220 performs a frequency demodulation on the chrominance components. Since each scan line of the SECAM signal contains only a chrominance signal $D_B$ or $D_R$, the demodulation performed by the color demodulator 220 is taken by detecting the subcarrier frequencies to thereby identify the chrominance signal $D_B$ or $D_R$ contained by each scan line and produce a $D_B/D_R$ identification signal. Thus, the $D_B$ signal output by the color demodulator 220 can be determined as the currently or previously received scan line, and the $D_R$ signal is also the same. Accordingly, it can be known that the $D_B$ or $D_R$ signal is to be reconstructed.

FIG. 3 is a schematic diagram of a typical $D_B/D_R$ signal reconstruction. Line 120 at Time T only contains the $D_R$ signal, so that the $D_B$ signal reconstruction is necessarily taken for Line 120. As shown in FIG. 3, the conventional process regards the $D_B$ signal in the previous line (Line 110) as the $D_B$ signal of Line 120 at the corresponding position. The $D_B$ signal in the previous line is stored in the line buffer block 230. Thus, the problem that only the chrominance signal $D_R$ is contained in Line 120 is overcome. In FIG. 3, the circle sign indicates the transmitting $D_B$ and $D_R$ chrominance signals, and the hexagonal sign indicates the reconstructed $D_B$ and $D_R$ chrominance signals.

However, the scan lines respectively in two adjacent frames at same positions contain the interlaced chrominance signals $D_B$ and $D_R$. Namely, for example, Line 120 in Frame T only contains the $D_R$ signal, and Line 120 in Frame T+1 only contains the $D_B$ signal. Accordingly, for the boundaries in the vertical direction, the tandem frames may appear the unmatched $D_B$ and $D_R$ signals on the lower boundaries to thus cause the flicker effect. For example, when Line 120 indicates an object boundary in a frame, the colors of the object (Line 120) and the background (Line 130) are significantly different, and the chrominance signals $D_B$ of Pixel 121 and Pixel 131 are significantly different. However, the chrominance signal $D_B$ for Pixel 131' in the prior art is derived from Pixel 121 as a copy, which causes a color dispersion at the boundary between Line 120 and Line 130 in Frame T+1 and have the different chrominance signals $D_B$ for Pixel 131 and Pixel 131'. Thus, the frame flicker is present.

U.S. Pat. No. 5,844,617 has disclosed a method and apparatus for enhancing the vertical resolution of a television signal having degraded vertical chrominance transitions, which converts a 4:2:0 format signal back to a 4:2:2 format signal by enhancing the vertical color resolution, i.e., enhancing the vertical bandwidth, to thereby use the high frequency information to determine the level of adding the high frequency color components back to the original color signal. However, the SECAM encoder typically bypasses the vertical low pass filter (LPF) and simply sends the current $D_B$ or $D_R$ signal. Contrary to the U.S. Pat. No. 5,844,617, the decoder does not require the high frequency component restored in the SECAM decoding. In addition, the signal received by the SECAM is not the 4:2:0 format.

Therefore, it is desirable to provide an improved method to mitigate and/or obviate the aforementioned problems.

SUMMARY OF THE INVENTION

An object of the present invention is to provide a color reconstruction system and method for a Sequential Color with Memory (SECAM) television signal, which can accurately reconstruct the chrominance signals $D_B$ and $D_R$ in a SECAM television system.

Another object of the present invention is to provide a color reconstruction system and method for a Sequential Color with Memory (SECAM) television signal, which can overcome the color missing and the flicker on a frame in the prior art.

According to a feature of the invention, a color reconstruction system for a Sequential Color with Memory (SECAM) television signal is provided. The system includes a luminance and chrominance separator and color decoder, a first line buffer block, a second line buffer block, a vertical similarity calculator and a reconstructor. The luminance and chrominance separator and color decoder receives and filters a SECAM television signal with a luminance and a chrominance to produce a luminance signal and a chrominance signal. The first line buffer block has line buffer and is connected to the luminance and chrominance separator and color decoder in order to temporarily store the luminance signal. The second line buffer block has a plurality of line buffers and is connected to the luminance and chrominance separator and color decoder in order to temporarily store the chrominance signal. The vertical similarity calculator is connected to the first line buffer block and the luminance and chrominance separator and color decoder in order to produce an upper similarity coefficient and a lower similarity coefficient based on the luminance signals produced by the luminance and chrominance separator and color decoder and temporarily stored in the first line buffer block. The reconstructor is connected to the second line buffer block and the vertical similarity calculator in order to depend on the upper and lower similarity coefficients to adjust the chrominance signal temporarily stored in the second line buffer block to thereby produce a reconstructed chrominance signal.

According to another feature of the invention, a color reconstruction method for a Sequential Color with Memory (SECAM) television signal implemented in a television is provided, which performs color reconstruction on a K-th pixel of an N-th video line, wherein the television signal has a plurality of video lines, each video line has a plurality of pixels. The method includes: (A) receiving and filtering the SECAM television signal for producing a luminance signal and a chrominance signal corresponding to the K-th pixel; (B) calculating vertical luminance differences of the K-th pixel to accordingly calculate an upper luminance difference signal and a lower luminance difference signal; (C) calculating vertical similarities of the K-th pixel to accordingly calculate an upper similarity coefficient and a lower similarity coefficient; (D) adjusting the chrominance signal based on the upper and lower similarity coefficients to thereby produce a reconstructed chrominance signal; wherein the upper similarity coefficient is smaller than or equal to the lower similarity coefficient when the upper luminance difference signal is greater than the lower luminance difference signal, and the upper similarity coefficient is greater than or equal to the lower similarity coefficient when the upper luminance difference signal is not greater than the lower luminance difference signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
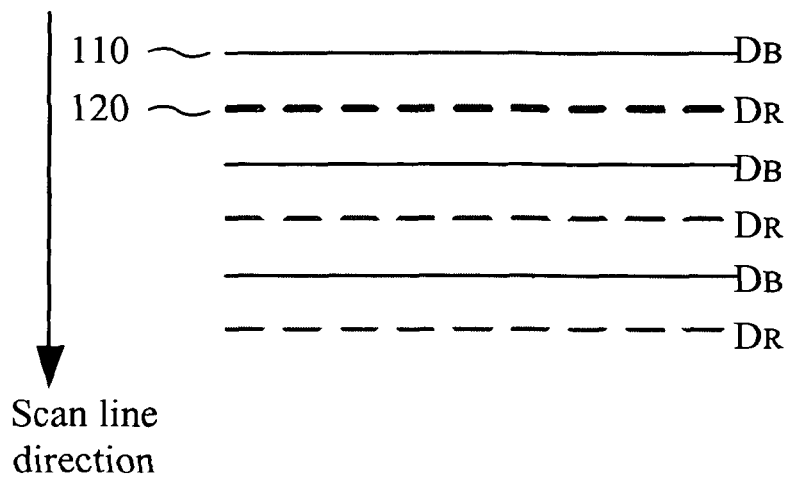
FIG. 1 is a schematic diagram of a typical Sequential Color with Memory (SECAM) signal coding.
Figure 2:
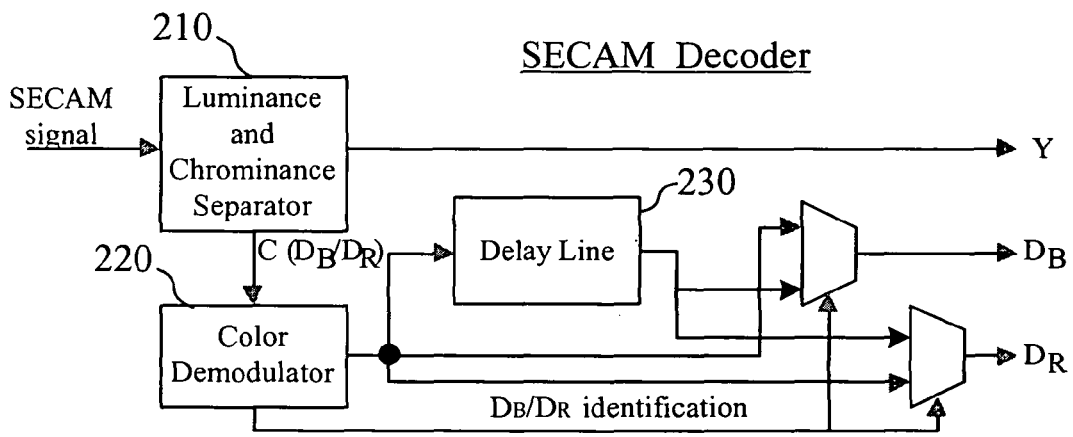
FIG. 2 is a block diagram of a typical SECAM signal decoder.
Figure 3:
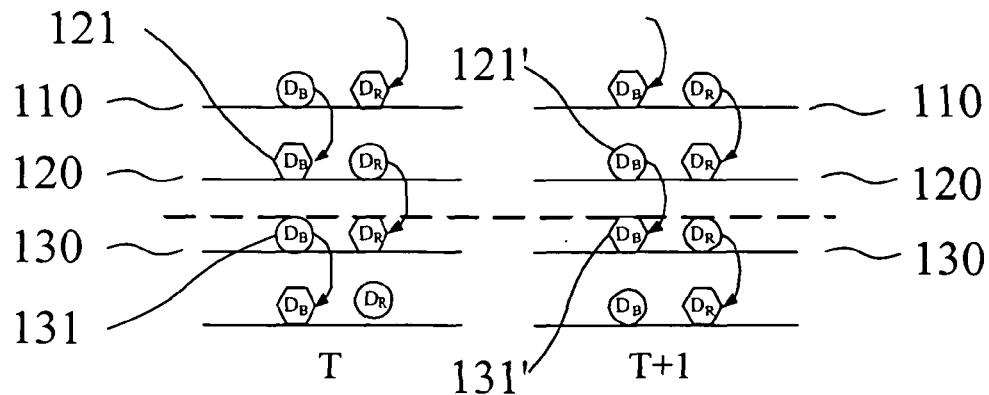
FIG. 3 is a schematic diagram of a typical $D_B/D_R$ signal reconstruction.
Figure 4:
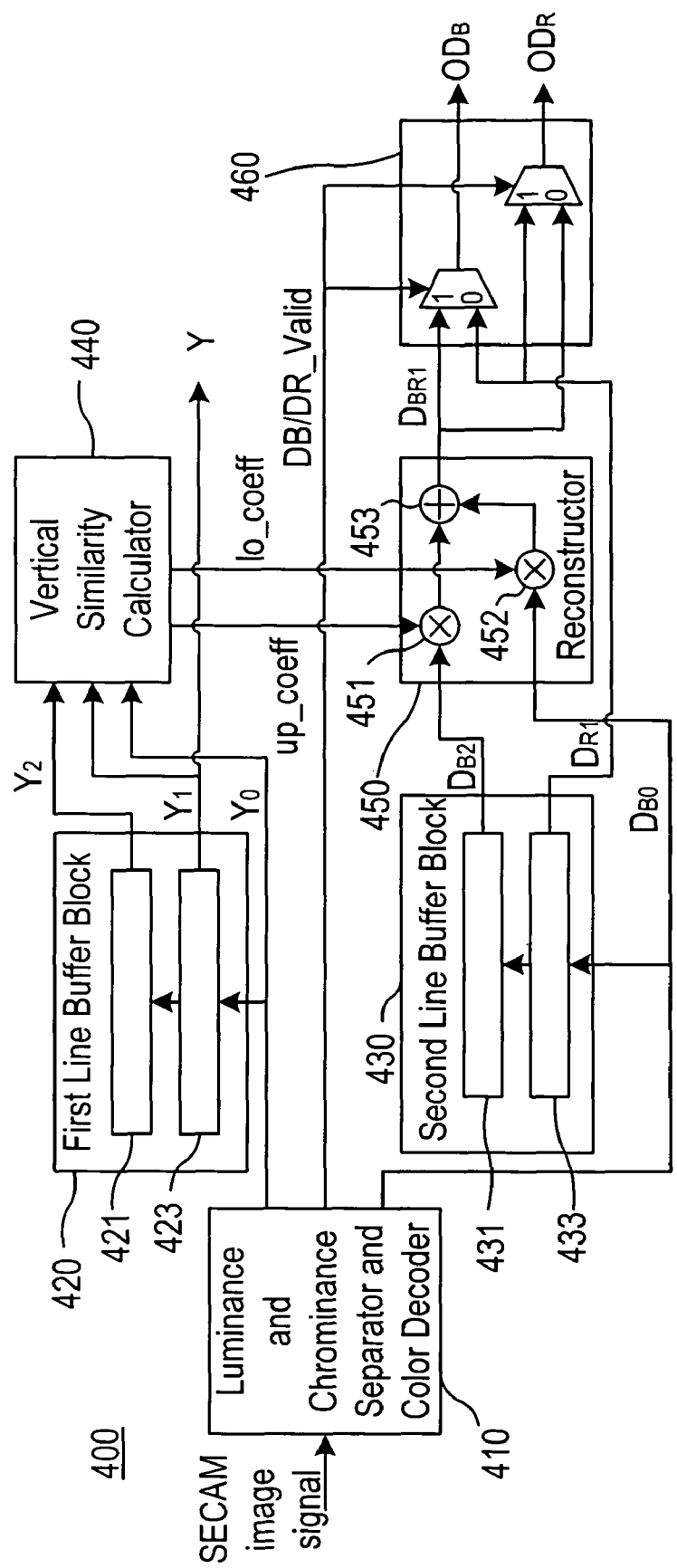
FIG. 4 is a block diagram of a color reconstruction system for a Sequential Color with Memory (SECAM) television signal according to the invention.

FIG. 4 is a block diagram of a color reconstruction system 400 for a Sequential Color with Memory (SECAM) television signal according to the invention. As shown in FIG. 4, the system 400 includes a luminance and chrominance separator and color decoder 410, a first line buffer block 420, a second line buffer block 430, a vertical similarity calculator 440, a reconstructor 450 and a selector 460.

The luminance and chrominance separator and color decoder 410 receives and filters a SECAM television signal having a luminance and a chrominance to thereby produce a luminance signal Y and a chrominance signal $D_B$ or $D_R$.

The luminance and chrominance separator and color decoder 410 detects the subcarrier frequency of the chrominance signal $D_B$ or $D_R$ to thereby produce a $D_B/D_R$ Valid signal for determining that the current output by the luminance and chrominance separator and color decoder 410 is the chrominance signal $D_B$ or $D_R$. For example, the luminance and chrominance separator and color decoder 410 currently outputs the chrominance signal $D_B$ when the $D_B/D_R$ Valid signal equals to one, and $D_R$ when the $D_B/D_R$ Valid signal equals to zero.

The first line buffer block 420 has at least a line buffer, and is connected to the luminance and chrominance separator and color decoder 410 in order to temporarily store the luminance signal.

In this embodiment, the first line buffer block 420 has a first line buffer 421 and a second line buffer 423. As shown in FIG. 4, the luminance and chrominance separator and color decoder 410 outputs the luminance signal $Y_0$ of a current line. The first line buffer 421 temporarily stores the luminance signal $Y_2$ of a previously second line. The second line buffer 423 temporarily stores the luminance signal $Y_1$ of a previously first line. The system 400 uses the luminance signal $Y_1$ temporarily stored in the second line buffer 423 as an output.

The second line buffer block 430 has a plurality of line buffers, and is connected to the luminance and chrominance separator and color decoder 410 in order to temporarily store the chrominance signal $D_B$ or $D_R$. As shown in FIG. 4, the second line buffer block 430 has a third line buffer 431 and a fourth line buffer 433. When the $D_B/D_R$ Valid signal equals to one, the luminance and chrominance separator and color decoder 410 currently outputs the chrominance signal $D_B$. In this case, the fourth line buffer 433 temporarily stores the chrominance signal $D_R$, and the third line buffer 431 temporarily stores the chrominance signal $D_B$. When the $D_B/D_R$ Valid signal equals to zero, the luminance and chrominance separator and color decoder 410 currently outputs the chrominance signal $D_R$. In this case, the fourth line buffer 433 temporarily stores the chrominance signal $D_B$, and the third line buffer 431 temporarily stores the chrominance signal $D_R$.

The vertical similarity calculator 440, is connected to the first line buffer block 420 and the luminance and chrominance separator and color decoder 410, in order to produce an upper similarity coefficient and a lower similarity coefficient based on the luminance signals respectively produced by the luminance and chrominance separator and color decoder 410 and temporarily stored in the first line buffer block 420.

Figure 5:
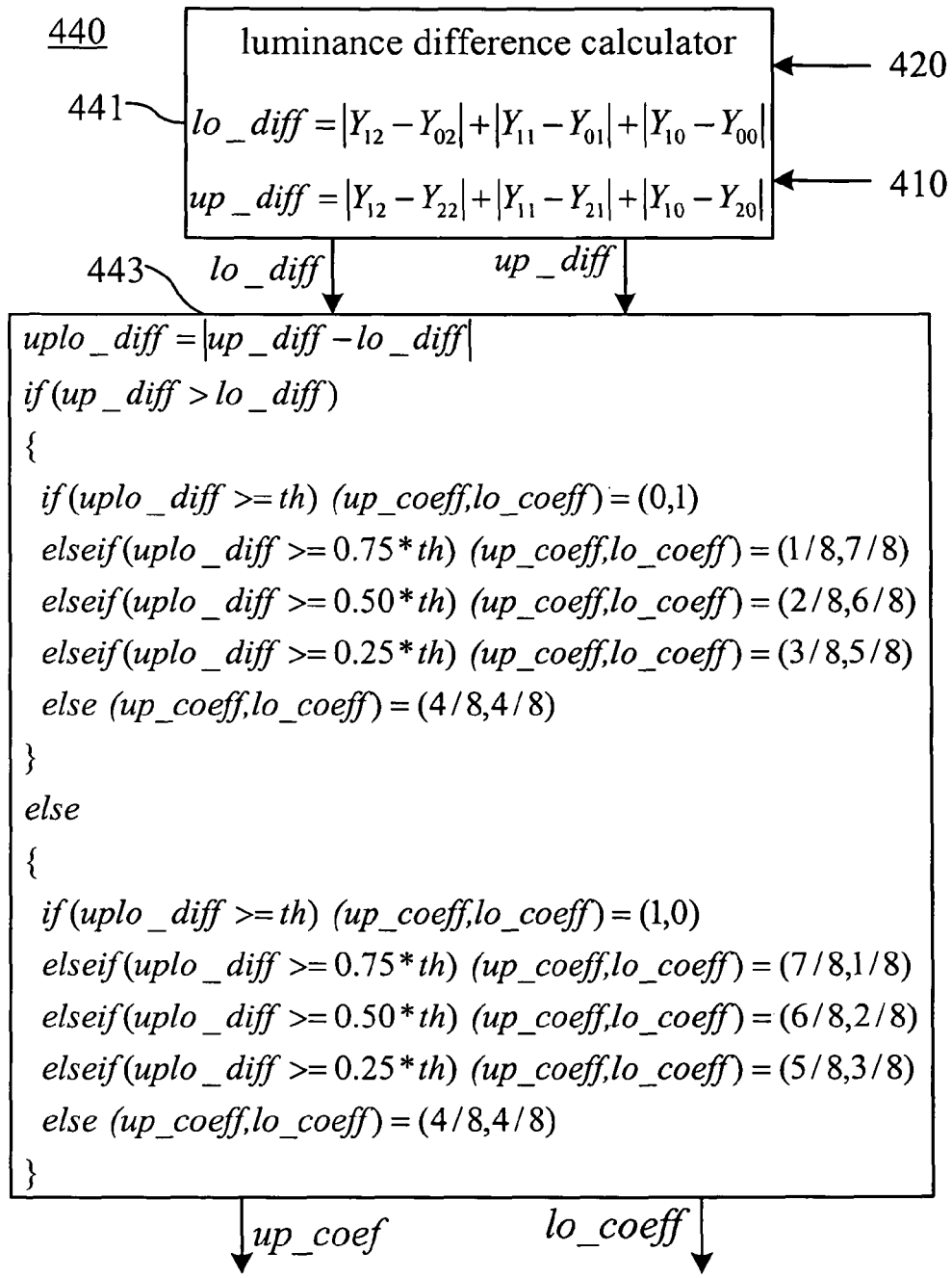
FIG. 5 is a block diagram of a vertical similarity calculator according to the invention.

FIG. 5 is a block diagram of the vertical similarity calculator 440 according to the invention. The vertical similarity calculator 440 includes a luminance difference calculator 441 and a coefficient generator 443.

The luminance difference calculator 441 is connected to the first line buffer block 420 and the luminance and chrominance separator and color decoder 410 in order to produce an upper luminance difference signal up_diff and a lower luminance difference signal lo_diff based on the luminance signals respectively produced by the luminance and chrominance separator and color decoder 410 and temporarily stored in the first line buffer block 420.

Figure 6:
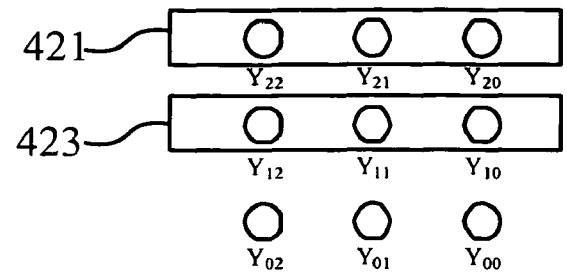
FIG. 6 is a schematic diagram of a storage of a first line buffer block according to the invention.

FIG. 6 is a schematic diagram of a storage of the first line buffer block 420 according to the invention. The upper luminance difference signal up_diff is expressed as follows:

$$\text{up\_diff} = |Y_{12} - Y_{22}| + |Y_{11} - Y_{21}| + |Y_{10} - Y_{20}|,$$

where $Y_{22}$, $Y_{21}$, $Y_{20}$ indicate luminance signals temporarily stored in the first line buffer 421, and $Y_{12}$, $Y_{11}$, $Y_{10}$ indicate luminance signals temporarily stored in the second line buffer 423. The system 400 uses the luminance signal $Y_{11}$ temporarily stored in the second line buffer 423 as an output. The lower luminance difference signal lo_diff is expressed as follows:

$$\text{lo\_diff} = |Y_{12}-Y_{02}|+|Y_{11}-Y_{01}|+|Y_{10}-Y_{00}|,$$

where $Y_{02}, Y_{01}, Y_{00}$ indicate luminance signals produced by the luminance and chrominance separator and color decoder 410, and $Y_{12}, Y_{11}, Y_{10}$ indicate the luminance signals temporarily stored in the second line buffer 423.

The coefficient generator 443 is connected to the luminance difference calculator 441 in order to produce the upper similarity coefficient up_coef and the lower similarity coefficient lo_coeff based on the upper luminance difference signal up_diff and the lower luminance difference signal lo_diff.

The coefficient generator 443 produces a difference indication signal uplo_diff based on the upper luminance difference signal up_diff and the lower luminance difference signal lo_diff.

When the upper luminance difference signal up_diff is greater than the lower luminance difference signal lo_diff, the upper similarity coefficient up_coef is smaller than or equal to the lower similarity coefficient lo_coeff. Namely, when the difference indication signal uplo_diff is greater than or equal to a threshold th, the upper similarity coefficient up_coef equals to zero, and the lower similarity coefficient lo_coeff equals to one. When the difference indication signal uplo_diff is smaller than the threshold th and greater than or equal to ¾ of the threshold th, the upper similarity coefficient up_coef equals to ⅛, and the lower similarity coefficient lo_coeff equals to ⅞. The remainders are the like and a detailed description is deemed unnecessary.

Accordingly, when the upper luminance difference signal up_diff is not greater than the lower luminance difference signal lo_diff, the upper similarity coefficient up_coef is greater than or equal to the lower similarity coefficient lo_coeff.

The reconstructor 450 is connected to the luminance and chrominance separator and color decoder 410, the second line buffer block 430 and the vertical similarity calculator 440 in order to depend on the upper and lower similarity coefficients up_coef and lo_coeff to adjust the first and second chrominance signals temporarily stored in the second line buffer block 430 to thereby produce a reconstructed chrominance signal $D_{BR1}$.

When the $D_B/D_R$ Valid signal equals to one, the luminance and chrominance separator and color decoder 410 currently outputs the color difference signal $D_B$. In this case, the reconstructed chrominance signal $D_{BR1}$ produced by the reconstructor 450 corresponds to the chrominance signal $D_B$. When the $D_B/D_R$ Valid signal equals to zero, the luminance and chrominance separator and color decoder 410 currently outputs the chrominance signal $D_R$. In this case, the reconstructed chrominance signal $D_{BR1}$ produced by the reconstructor 450 corresponds to the chrominance signal $D_R$.

The reconstructor 450 includes a first multiplier 451, a second multiplier 452 and an adder 453. The reconstructed chrominance signal $D_{BR1}$ is expressed as follows:

$$D_{BR1} = \text{up\_coeff} \times D_{BR2} + \text{lo\_coeff} \times D_{BR0},$$

where up_coeff indicates the upper similarity coefficient, lo_coeff indicates the lower similarity coefficient, $D_{BR0}$ indicates the chrominance signal currently output by the luminance and chrominance separator and color decoder 410, and $D_{BR2}$ indicates the chrominance signal output by the third line buffer 431.

The selector 460, is connected to the reconstructor 450, the fourth line buffer 433 of the second line buffer block 430 and the luminance and chrominance separator and color decoder 410. According to a select signal $D_B/D_R$ Valid output by the luminance and chrominance separator and color decoder 410, the selector 460 selects the reconstructed chrominance signal $D_{BR1}$ or the chrominance signal output by the fourth line buffer of the second line buffer block to further output a first output chrominance signal $OD_B$ and a second output chrominance signal $OD_R$.

Figure 7:
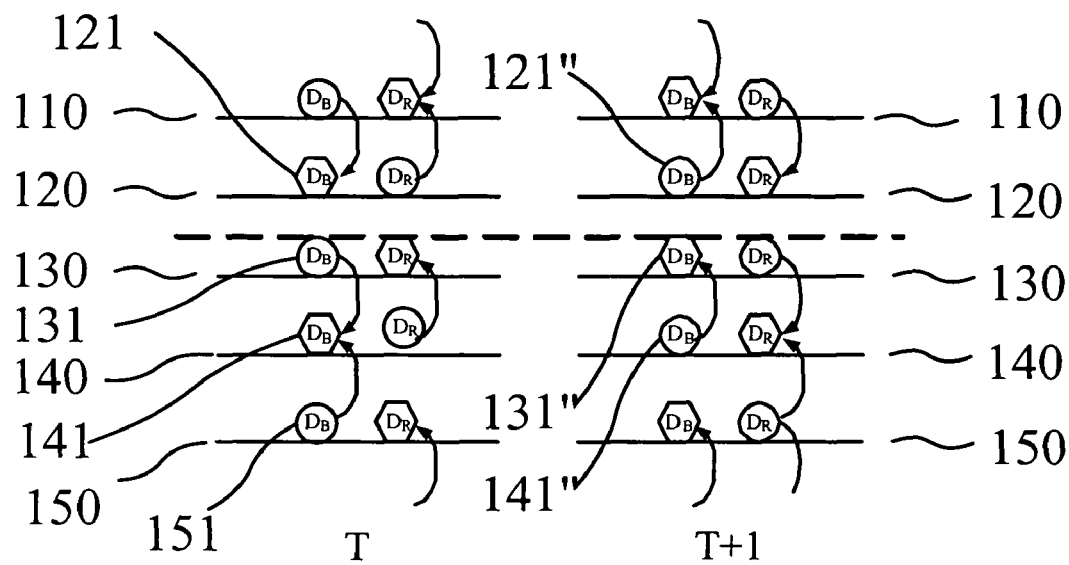
FIG. 7 is a schematic diagram of a $D_B/D_R$ signal reconstruction according to the invention.

FIG. 7 is a schematic diagram of the $D_B/D_R$ signal reconstruction according to the invention. In FIG. 7, the circle sign indicates the transmitting $D_B$ and $D_R$ chrominance signals, and the hexagonal sign indicates the reconstructed $D_B$ and $D_R$ chrominance signals. As shown in FIG. 7, for reconstructing the chrominance signal $D_B$ of Line 140, the similarity of the luminance Y of Line 140, Line 130 and Line 150 is considered to thereby produce the upper similarity coefficient up_coef and the lower similarity coefficient lo_coeff. When the upper luminance difference signal up_diff is greater than the lower luminance difference signal lo_diff, it indicates that the similarity of the luminance Y of Line 140 and Line 150 is greater than that of Line 140 and Line 130, and the upper similarity coefficient up_coef is smaller than or equal to the lower similarity coefficient lo_coeff. When the upper luminance difference signal up_diff is not greater than the lower luminance difference signal lo_diff, it indicates that the similarity of the luminance Y of Line 140 and Line 130 is greater than that of Line 140 and Line 150, and the upper similarity coefficient up_coef is greater than or equal to the lower similarity coefficient lo_coeff. Thus, the better image quality is obtained.

As shown in FIG. 7, when Line 120 indicates a boundary of object from a frame, the colors of the object (Line 120) and the background are significantly different. Also, the chrominance signals $D_B$ of Pixel 121 and Pixel 131 are significantly different. In this case, the luminance of Line 130 and Line 140 of Frame T+1 is similar, and the chrominance signal $D_B$ for Pixel 131" is essentially derived from that for Pixel 141", rather than from that for Pixel 121" in the prior art. Accordingly, the boundary of Line 120 and Line 130 of Frame T+1 does not generate the effect of color missing, and the chrominance signals $D_B$ of Pixel 131 and Pixel 131" are not significantly different. Thus, our invention can avoid the frame flicker occurred in the prior art.

Figure 8:
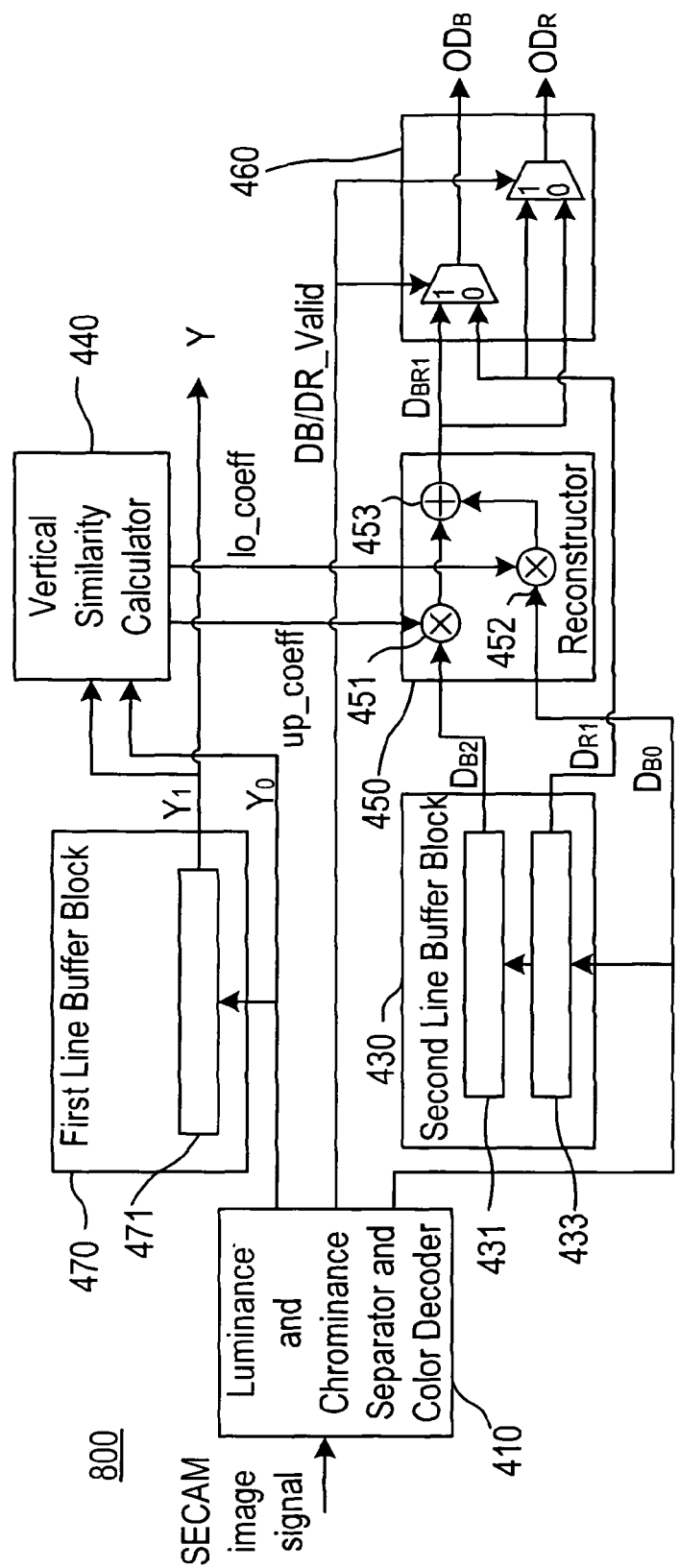
FIG. 8 is a block diagram of another embodiment of a color reconstruction system for a Sequential Color with Memory (SECAM) television signal according to the invention.

FIG. 8 is a block diagram of a color reconstruction system 800 for a Sequential Color with Memory (SECAM) television signal according to another embodiment of the invention. In FIG. 8, only a line buffer 471 is included in the first line buffer block 470, as compared to FIG. 4. The implementation in FIG. 8 can have the functions as same as in FIG. 4, and thus no more detail is described.

Figure 9:
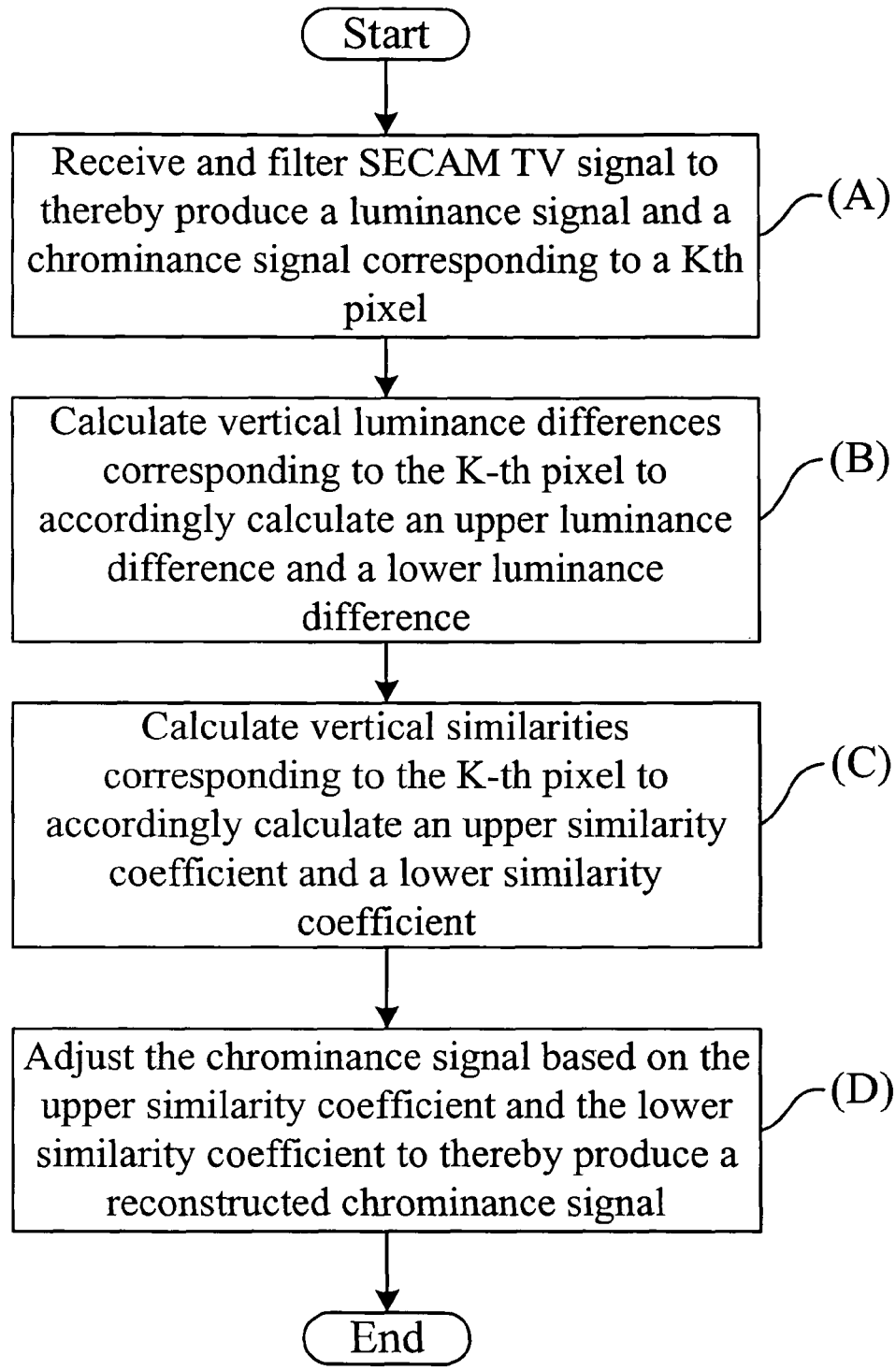
FIG. 9 is a flowchart of a color reconstruction method for a Sequential Color with Memory (SECAM) television signal according to the invention.

FIG. 9 is a flowchart of a color reconstruction method for a Sequential Color with Memory (SECAM) television signal according to the invention. In FIG. 9, the television signal has a plurality of video lines, and each video line has a plurality of pixels. The method performs a reconstruction on a K-th pixel of an N-th video line.

Step (A) receives the SECAM television signal in order to filter the SECAM television signal to thereby produce a luminance signal and a chrominance signal corresponding to the K-th pixel.

Step (B) calculates the vertical luminance differences corresponding to the K-th pixel to accordingly calculate an upper luminance difference signal up_diff and a lower luminance difference signal lo_diff. The upper luminance difference signal up_diff is expressed as follows:

$$\text{up\_diff} = |Y_{12}-Y_{22}|+|Y_{11}-Y_{21}|+|Y_{10}-Y_{20}|,$$

where $Y_{22}$, $Y_{21}$, $Y_{20}$ indicate luminance signals temporarily stored in the first line buffer 421, and $Y_{12}$, $Y_{11}$, $Y_{10}$ indicate luminance signals temporarily stored in the second line buffer 423. The lower luminance difference signal lo_diff is expressed as follows:

$$\text{lo\_diff} = |Y_{12}-Y_{02}|+|Y_{11}-Y_{01}|+|Y_{10}-Y_{00}|,$$

where $Y_{02}$, $Y_{01}$, $Y_{00}$ indicate luminance signals produced by the luminance and chrominance separator and color decoder 410, and $Y_{12}$, $Y_{11}$, $Y_{10}$ indicate the luminance signals temporarily stored in the second line buffer 423.

Step (C) calculates the vertical similarities corresponding to the K-th pixel to accordingly calculate an upper similarity coefficient and a lower similarity coefficient. When the upper luminance difference signal up_diff is greater than the lower luminance difference signal lo_diff, the upper similarity coefficient up_coef is smaller than or equal to the lower similarity coefficient lo_coeff. When the upper luminance difference signal up_diff is not greater than the lower luminance difference signal lo_diff, the upper similarity coefficient up_coef is greater than or equal to the lower similarity coefficient lo_coeff.

Step (D) adjusts the chrominance signal based on the upper and lower similarity coefficients to thereby produce a reconstructed chrominance signal $D_{BR1}$. The reconstructed chrominance signal $D_{BR1}$ is expressed as follows:

$$D_{BR1} = \text{up\_coeff} \times D_{BR2} + \text{lo\_coeff} \times D_{BR0},$$

where up_coeff indicates the upper similarity coefficient, lo_coeff indicates the lower similarity coefficient, $D_{BR0}$ indicates the chrominance signal currently output by the luminance and chrominance separator and color decoder 410, and $D_{BR2}$ indicates the chrominance signal output by the third line buffer 431.

As cited, when the color is reconstructed, the similarity of the luminance Y of Line 140, Line 130 and Line 150 are considered, and accordingly the upper similarity coefficient up_coef and the lower similarity coefficient lo_coeff are further changed in order to adjust the weights to thereby obtain a better image quality. When the inventive technique is applied to an object boundary of a frame, the colors of the object and background of the frame are significantly different. In this case, the chrominance signals of the pixels with similar luminance are selected for color reconstruction to thereby eliminate the effect of color missing at the boundary between the object and background of the frame. Also, the flicker occurred in the prior art can be avoided in the present invention.

Although the present invention has been explained in relation to its preferred embodiment, it is to be understood that many other possible modifications and variations can be made without departing from the spirit and scope of the invention as hereinafter claimed.

What is claimed is:

1. A color reconstruction system for a Sequential Color with Memory (SECAM) television signal, comprising:
    a luminance and chrominance separator and color decoder, for receiving and filtering an SECAM television signal with a luminance and a chrominance to produce a luminance signal and a chrominance signal;
    a first line buffer block, having line buffer and connected to the luminance and chrominance separator and color decoder, for temporarily storing the luminance signal;
    a second line buffer block, having a plurality of line buffers and connected to the luminance and chrominance separator and color decoder, for temporarily storing the chrominance signal;
    a vertical similarity calculator, connected to the first line buffer block and the luminance and chrominance separator and color decoder, for producing an upper similarity coefficient and a lower similarity coefficient based on the luminance signals respectively from the luminance and chrominance separator and color decoder and the first line buffer block;
    a reconstructor, connected to the second line buffer block and the vertical similarity calculator, for depending on the upper and lower similarity coefficients to adjust the chrominance signal temporarily stored in the second line buffer block to thereby produce a reconstructed chrominance signal; and
    a selector connected to the reconstructor, the second line buffer block and the luminance and chrominance separator and color decoder, for selecting the reconstructed chrominance signal or the chrominance signal output by the second line buffer block to further output a first output chrominance signal and a second output chrominance signal according to a select signal output by the luminance and chrominance separator and color decoder.

2. The system as claimed in claim 1, wherein the first line buffer block comprises a first line buffer and a second line buffer, and the second line buffer block comprises a third line buffer and a fourth line buffer.

3. The system as claimed in claim 2, wherein the vertical similarity calculator comprises a luminance difference calculator, connected to the first line buffer block and the luminance and chrominance separator and color decoder, for producing an upper luminance difference signal and a lower luminance difference signal based on the luminance signals respectively from the luminance and chrominance separator and color decoder and the first line buffer block.

4. The system as claimed in claim 3, wherein the upper luminance difference signal up_diff is expressed as:

$$\text{up\_diff} = |Y_{12}-Y_{22}|+|Y_{11}-Y_{21}|+|Y_{10}-Y_{20}|,$$

where $Y_{22}$, $Y_{21}$ and $Y_{20}$ indicate luminance signals temporarily stored in the first line buffer, and $Y_{12}$, $Y_{11}$ and $Y_{10}$ indicate luminance signals temporarily stored in the second line buffer.

5. The system as claimed in claim 4, wherein the lower luminance difference signal lo_diff is expressed as:

$$\text{lo\_diff} = |Y_{12}-Y_{02}|+|Y_{11}-Y_{01}|+|Y_{10}-Y_{00}|,$$

where $Y_{02}$, $Y_{01}$ and $Y_{00}$ indicate luminance signals produced by the luminance and chrominance separator and color decoder, and $Y_{12}$, $Y_{11}$ and $Y_{10}$ indicate the luminance signals temporarily stored in the second line buffer.

6. The system as claimed in claim 5, wherein the vertical similarity calculator further comprises a coefficient generator, connected to the luminance difference calculator, for producing the upper similarity coefficient and the lower similarity coefficient based on the upper luminance difference signal and the lower luminance difference signal.

7. The system as claimed in claim 6, wherein the upper similarity coefficient is smaller than or equal to the lower similarity coefficient when the upper luminance difference signal is greater than the lower luminance difference signal, and the upper similarity coefficient is greater than or equal to the lower similarity coefficient when the upper luminance difference signal is not greater than the lower luminance difference signal.

8. The system as claimed in claim 2, wherein the reconstructed chrominance signal $D_{BR1}$ is expressed as follows:

$$D_{BR1} = \text{up\_coeff} \times D_{BR2} + \text{lo\_coeff} \times D_{BR0},$$

where up_coeff indicates the upper similarity coefficient, lo_coeff indicates the lower similarity coefficient, $D_{BR0}$ indicates the chrominance signal, and $D_{BR2}$ indicates a chrominance signal output by the third line buffer.

9. A color reconstruction method for a Sequential Color with Memory (SECAM) television signal implemented in a television, comprising the steps of:
   (A) receiving and filtering the SECAM television signal for producing a luminance signal and a chrominance signal corresponding to a pixel;
   (B) calculating vertical luminance differences corresponding to the pixel to accordingly calculate an upper luminance difference signal and a lower luminance difference signal, wherein the upper luminance difference signal up_diff is expressed as:

$$\text{up\_diff} = |Y_{12} - Y_{22}| + |Y_{11} - Y_{21}| + |Y_{10} - Y_{20}|,$$

where $Y_{22}$, $Y_{21}$ and $Y_{20}$ indicate luminance signals temporarily stored in a first line buffer, and $Y_{12}$, $Y_{11}$ and $Y_{10}$ indicate luminance signals temporarily stored in a second line buffer;
   (C) calculating vertical similarities corresponding to the pixel to accordingly calculate an upper similarity coefficient and a lower similarity coefficient; and
   (D) adjusting the chrominance signal based on the upper and lower similarity coefficients to thereby produce a reconstructed chrominance signal;
   wherein the upper similarity coefficient is smaller than or equal to the lower similarity coefficient when the upper luminance difference signal is greater than the lower luminance difference signal, and the upper similarity coefficient is greater than or equal to the lower similarity coefficient when the upper luminance difference signal is not greater than the lower luminance difference signal.

10. The method as claimed in claim 9, wherein the lower luminance difference signal lo_diff is expressed as:

$$\text{lo\_diff} = |Y_{12} - Y_{02}| + |Y_{11} - Y_{01}| + |Y_{10} - Y_{00}|,$$

where $Y_{02}$, $Y_{01}$ and $Y_{00}$ indicate luminance signals produced in step (A), and $Y_{12}$, $Y_{11}$ and $Y_{10}$ indicate the luminance signals temporarily stored in the second line buffer.

11. The method as claimed in claim 10, wherein the upper similarity coefficient is smaller than or equal to the lower similarity coefficient when the upper luminance difference signal is greater than the lower luminance difference signal, and the upper similarity coefficient is greater than or equal to the lower similarity coefficient when the upper luminance difference signal is not greater than the lower luminance difference signal.

12. The method as claimed in claim 11, wherein the reconstructed chrominance signal $D_{BR1}$ is expressed as follows:

$$D_{BR1} = \text{up\_coeff} \times D_{BR2} + \text{lo\_coeff} \times D_{BR0},$$

where up_coeff indicates the upper similarity coefficient, lo_coeff indicates the lower similarity coefficient, $D_{BR0}$ indicates the chrominance signal, and $D_{BR2}$ indicates a chrominance signal output by the third line buffer.

\* \* \* \* \*